United States Patent
Kuehmstedt et al.

[11] Patent Number: 6,055,056
[45] Date of Patent: Apr. 25, 2000

[54] DEVICE FOR NON-CONTACT MEASUREMENT OF THE SURFACE OF A THREE DIMENSIONAL OBJECT

[75] Inventors: Peter Kuehmstedt; Wolfgang Schreiber; Gunther Notni, all of Jena, Germany

[73] Assignee: Fraunhofer-Gesellschaft zur Foerderung der Angewandten Forschung E.V., Munich, Germany

[21] Appl. No.: 09/180,344

[22] PCT Filed: Apr. 30, 1997

[86] PCT No.: PCT/DE97/00896

§ 371 Date: Jun. 17, 1999

§ 102(e) Date: Jun. 17, 1999

[87] PCT Pub. No.: WO97/42464

PCT Pub. Date: Nov. 13, 1997

[30] Foreign Application Priority Data

May 6, 1996 [DE] Germany ............................ 196 18 140

[51] Int. Cl.⁷ .................................................. G01B 11/24
[52] U.S. Cl. ...................... 356/376; 356/243.4; 356/375
[58] Field of Search ...................... 356/376, 375, 356/243.1, 243.3, 243.4, 243.8; 250/252.1, 559.1, 559.19, 559.22, 559.29

[56] References Cited

U.S. PATENT DOCUMENTS

| | | | |
|---|---|---|---|
| 4,286,852 | 9/1981 | Stern et al. | 354/77 |
| 4,682,894 | 7/1987 | Schmidt et al. | 356/375 |
| 4,925,308 | 5/1990 | Stern et al. | 356/375 |
| 5,085,502 | 2/1992 | Womack et al. | 356/376 |
| 5,260,770 | 11/1993 | Nakamura et al. | 356/375 |
| 5,612,786 | 3/1997 | Huber et al. | 356/376 |
| 5,838,428 | 11/1998 | Pipitone et al. | 356/3.09 |

FOREIGN PATENT DOCUMENTS

| | | |
|---|---|---|
| 0 157 299 A1 | 10/1985 | European Pat. Off. . |
| 44 16 108 A1 | 11/1995 | Germany . |

OTHER PUBLICATIONS

TM Technisches Messen, Sep. 1995, No. 9, Munich Germany; "Optische Dreikoordinatenmessung mit strukturierter Beleuchtung", Wolfgang Schreiber, Jorg Gerber and Richard Kowarschik; pp. 321–327.

IEEE Transactions on Systems, Man, and Cybernetics; Bd. 23; May/Jun. 1993, No. 3, New York, U.S.; "Polyhedral Face Reconstruction and Modeling from a Single Image with Structured Light"; Zen Chen, Shinn–Ying Ho, and Din–Chang Tseng; pp. 864–872.

*Primary Examiner*—Hoa Q. Pham
*Attorney, Agent, or Firm*—Marshall & Melhorn

[57] ABSTRACT

This invention concerns a device for non-contact measurement of the surface of a three dimensional object in a measuring chamber with a projection device which projects a strip structure on the surface of an object, an observing device for recording the strip structure at measuring points on the surface of the object, a device for moving the object together with the observing device around a first axis of rotation, and an evaluation unit for determining the co-ordinates of the measuring points using the phase values of the strip structure in a predetermined co-ordinate system. A device (8) for moving the object about at least a second axis of rotation (D2) independent of the first axis of rotation (D1) and a calibration unit are provided, where the calibration unit (10) can determine the position of the second rotational axis (D2) in the predetermined co-ordinate system.

10 Claims, 3 Drawing Sheets

DEVICE FOR NON-CONTACT MEASUREMENT OF THE SURFACE OF A THREE DIMENSIONAL OBJECT

BACKGROUND OF THE INVENTION

The invention relates to a device for non-contact measurement of the surface of a three-dimensional object.

Such devices are particularly used in mechanical engineering, car manufacture, ceramics industry, footwear industry, jewelry industry, dental surgery and human medicine and in other fields.

The increasing requirements for a largely complete quality control during the running production process as well as after digitizing the three-dimensional form of the prototypes make plotting the surface topographies one's measuring task which is more and more frequently set. Hence, the task is set to determine the coordinates of single points of the surface of objects to be measured during a short time.

There are different approaches to solve both the time and scanning problems by the application of optical measuring systems. The advantage of optical measuring systems is in the non-contact and thus reactionless measurement as well as in that the information on the object are present in an illustrative form and thus in an easily understood manner. These optical measuring systems comprise the fringe projection method including Gray-Code technique, the moir, technique, holographic and speckle contouring as well as photogrammetry. It is typical for such methods that the measured variables of interest, the three-dimensional coordinates of the surfaces of objects are indirectly determined from the phase measured variables in images of intersection lines of patterns of light such as fringe patterns projected on to the object, from phase measured variables of the moir, technique, from the coordinates of the piercing points of observing beams through the receiving area and/or from parameters which characterize the geometry of the set-up of measuring instruments, i.e. the light sources, optical components as well as the image recording device. With known geometrical parameters of the set-up of measuring instruments the coordinates of the measuring points on the surface of the object can be calculated in a sensor system of coordinates by means of triangulation from three phase measured variables being linearly independent from each other and/or respective image and pixel coordinates. For generating the patterns of light different projection systems are employed such as programmable LCD projectors, slidable glass supports having different grid structures within a projector, the combination between a grid which can be electrically switched and a mechanical shifting device or the projection of single grids based on glass supports as well.

SUMMARY OF THE INVENTION

The invention is based on the object to provide a device for non-contact measurement of the surface of a three-dimensional object which enables a measurement of the coordinates for all partial views of the test object within a standard system of coordinates, wherein failures of measuring points by virtue of high lights or shadings on the surface of the object are avoided.

Based on the inventory device with the calibration unit provided thereto it is possible to measure the coordinates for all partial views of the test object within a standard system of coordinates. By the application of two and three axes of rotation, respectively, hence it is achieved all portions of the surface of the test object to be measured. With an adjustment to be uniquely provided by means of two suitable calibration bodies respective one and two particular axes for the motion of the object within the system of coordinates as well as the grid period in the room for precision measuring and an angle a of the first axis of rotation with the optical axis of the projection system are determined. With the data thus gained the various partial views of the test objects are transformed into a standard system of coordinates. With the device according to the invention a total measurement having a measuring incertainity in the range of $10^{-4}$ of the measuring volume is enabled.

The device according to the invention has the substantial advantage which is based on a free selection of the number of positions of the object with regard to the axes of rotation and the free selection of the angles for the single positions, that failures of measuring points caused by high lights on the surface of the object as well as shadings of the illumination as well and/or observation through a sufficient or suitable selection of positions are avoided.

One embodiment of the invention is shown in the drawing and will explained in more detail in the following description, in which:

DESCRIPTION OF THE PREFERRED EMBODIMENTS

Figure 1:
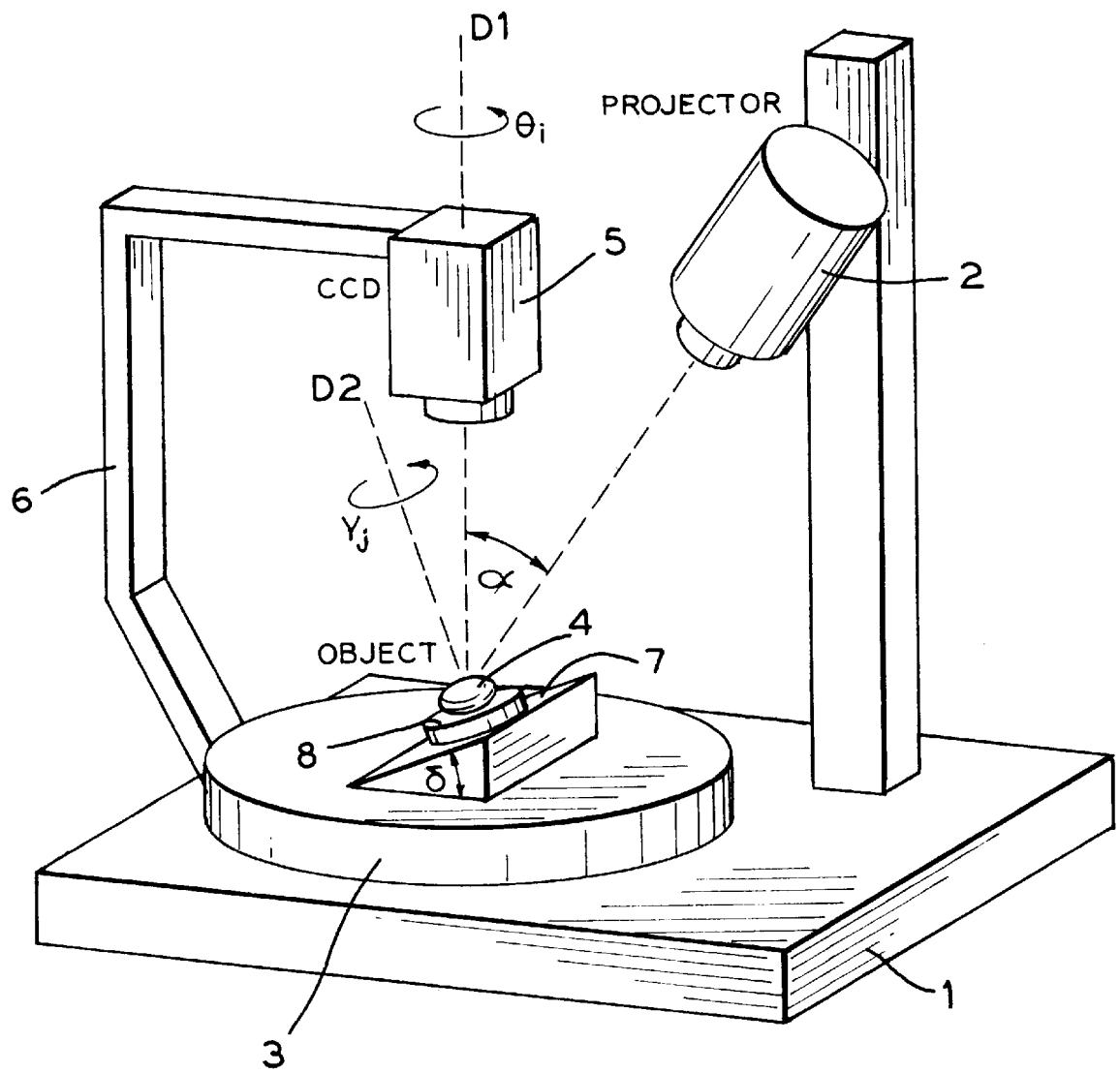
FIG. 1 shows a diagrammatic view of the device according to the invention.

The device for non-contact measurement of the surface of a three-dimensional object which is shown in FIG. 1 comprises a projector 2 designed to be fixed to a base plate 1 which includes a light source having condenser and projective lenses as well as a projection grid with equidistant grid lines being disposed in parallel to each other and a phase shift device for phase displacement of the grid structure. Furthermore, a first revolving stage is provided on the base plate 1 which the object 4 to be measured is arranged thereon and which a camera 5 preferably a CCD-camera is fixedly and rigidly connected thereon through a support arm 6. The revolving stage 3, object 4 and camera 5 are thus rotatable about a first axis of rotation D1 according to a predetermined angle of rotation $\theta_i$. The axis of rotation D1 includes with the optical axis of the projector a fixed angle $\alpha$, wherein the direction of illumination upon the object is changed by the rotation of the camera 5 and object 4 about their common axis.

On the first revolving stage 3 a sloped support plate 7 is centrally disposed at an angle of inclination $\delta$ on which a second revolving stage 8 is provided with the object 4 resting thereon. The second revolving stage 8 is rotatable about an axis of rotation D2 according to angles of rotation $\gamma_j$. In the embodiment according to FIG. 1 the axis of rotation D2 is disposed in accordance with $\delta$ about 30° towards the vertical axis of rotation D1 and the axis of rotation D2 intersects the axis of rotation D1 in the centre of the volume of the test object 4. The system of coordinates is determined such that the first axis of rotation D1 forming the z-axis and in that the y-z plane being the plane commonly formed by the first axis of rotation D1 and the second axis of rotation D2, wherein the x-axis extends through the intersecting point of D1 and D2 and is vertically on the y-z plane.

Furthermore, a third axis of rotation D3 not shown can be provided which is to be identically with the x-axis.

With the measuring device according to FIG. 1 the measurement of coordinates in a uniform system of coordinates is possible for all partial views of the test object 4. By the application of respective two and three axes of rotation D1, D2 and D3, respectively, thus is obtained all parts of the surface of the test object being measured in a total measurement.

For this total measurement the position of the axes of rotation D1, D2 and D3, respectively, as well as the angle α, grid constant Λ and spatial frequency 2/πΛ in the measuring volume have to be known, respectively.

The object 4 to be measured is consecutively illuminated with a periodical grid structure from different directions wherein the grid is periodically shifted vertically towards the grid lines and within the plane of the grid lines (e.g. $\Delta\phi_1=0°$, $\Delta\phi_2=90°$, $\Delta\phi_3=180°$) respectively, (vertically towards the projection axis). The intensity distribution on the sectional plane of the grid lines with the object surface is scanned by the CCD-camera 5. The intensity can be described with the following formula $I_k=I_o[1+m \cos(\phi+\Delta_k)]$ in which m is the modulation between 0 and 1, $\Delta\phi_k$ a phase step, k a number of the phase step. From the phase shifted intensity images from one direction one respective phase measuring value φhd iis obtained for each pixel. Then, the i-adic different directions result in i-adic linearly independent phase values for each pixel.

In the present case for a total measurement of the whole object 4 to be measured it is moved through the axes of rotation D1, D2 and D3, respectively, such that all parts of the surface are viewed through the CCD-camera. The thus measured partial views are transformed into a uniform system of coordinates with knowing the spatial positions of D2 and D3.

The measurement is performed in detail as follows:

1) An intensity image is taken for a fixed position of all axes of rotation. Then, a shift of the grid and a new intensity image take place.

With such at least three phase shifted intensity structures the phase values are calculated for each pixel for the fixed position of all axes of rotation.

2) By adjusting a new position of the axis of rotation D1 a new grid structure is projected on the object. The steps from 1) are repeated.

3) With at least three different positions of the axis of rotation D1 the coordinates x, y, z for each pixel can be calculated from the phase measured values of step 1).

Thus, the coordinate calculation with regard to a sensor system of coordinates is completed for one partial view of the object which is determined by the position of the axis of rotation D2 which is in view of the CCD-camera.

4) A rotation of the object occurs about the angle of rotation $\gamma_i$ by means of the axis of rotation D2. Thus, another part of the object is brought into the field of view of the CCD-camera.

5) For this new position of the axis of rotation D2 the steps 1) to 3) are repeated.

6) The motion of the object performed in the step 4) with regard to the system of coordinates of the device is compensated by a rotation of the coordinates x, y, z of each pixel about the axis of rotation D2 having the angles of rotation $\gamma_i$. As a result for all partial views of the object surface the coordinates are obtained in a uniform sensor system of coordinates.

The following plan of measurement is used: Five angular positions of D1 ($\theta_i=0°$, 60°, 120°, −60°, −120°) and four angular positions of D2 ($\gamma_j=0°$, 90°, 180°, 270°) are combined in all into four partial view measurements which are combined with two angular positions of D3 (0°, 90°). Thus, eight partial view measurements result altogether which cover the entire surface of the test object for many test objects. With complicated test objects the number of angular positions can be increased in any extent desired for each of the three axes of rotation.

Since the grid period in the room for precision measuring and the angle α of the first axis of rotation D1 with the optical axis of the projector 2 are not properly known with sufficient accuracy as well as the position of the axes of rotation D2 and D3 are not known in advance adjusting once to be performed into two and three measuring operations, respectively, has to be carried out by means of two suitable calibration bodies.

Figure 2B:
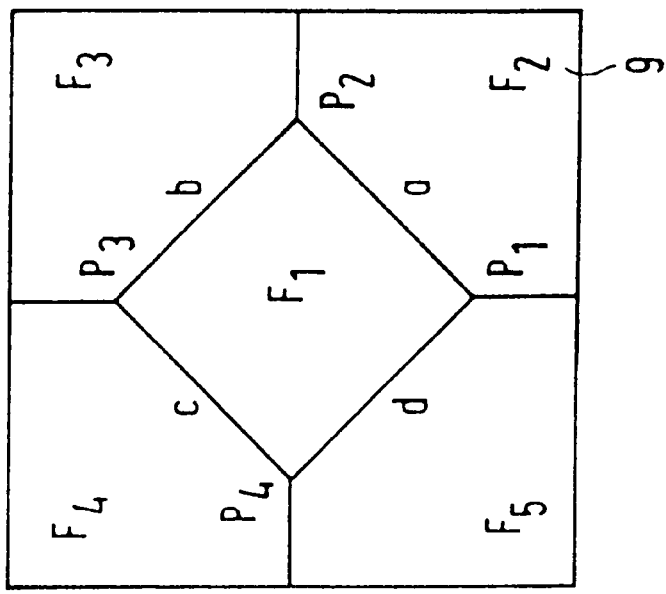
FIG. 2 show a perspective view and a top view upon the first calibration body.
Figure 2A:
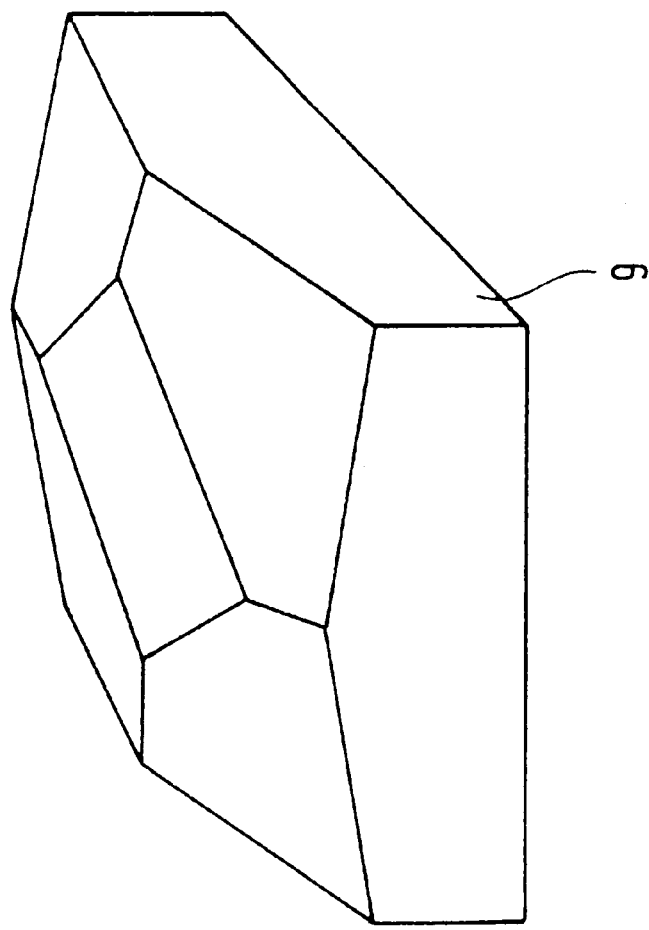

With the first calibration body shown in FIG. 2 in perspective and top views the grid period Λ in the room for precision measuring i.e. in the location where the test object is located during the measurements and the angle a are determined. This calibration body 9 comprises plane surfaces being arranged in a prism-like manner wherein the distances a, b, c, d of the points P1, P2, P3, P4 have been previously measured and calculated, respectively. These distances are independent from the orientation of the calibration body 9 in the room for precision measuring. Furthermore, the angles between the normal unit vectors of the lateral surfaces F2, F3, F4, F5 towards the normal unit vector of the central surface F1 are known as predetermined parameters.

As previously described, the strip structure is projected on the calibration body 9 and the phase values are calculated here as well. The spacings $a_0$, $b_0$, $c_0$, $d_0$ are calculated using the start values $\Lambda_0$ and $\alpha_0$. These start values should not substantially differ from the correct values (some degrees related to the angle α and less than 50% for the grid period Λ). Subsequently, an iterative correction of these start values is performed by means of the known nominal parameters of the first calibration body 9 until the convergence ratio is achieved. In this manner the grid period Λ and the angle α can be found by adjusting. The calibration body is characterized by the length of the sides of the upper surface and the angles between the upper surface and the four lateral surfaces as parameters. The coordinates of the body are not substantial since no requirements are claimed with regard to a proper positioning within the measuring volume and thus coordinates are not available as reference values. The plan surfaces and the previously mentioned parameters are substantial since these are independent relative to its position.

Figure 3A:
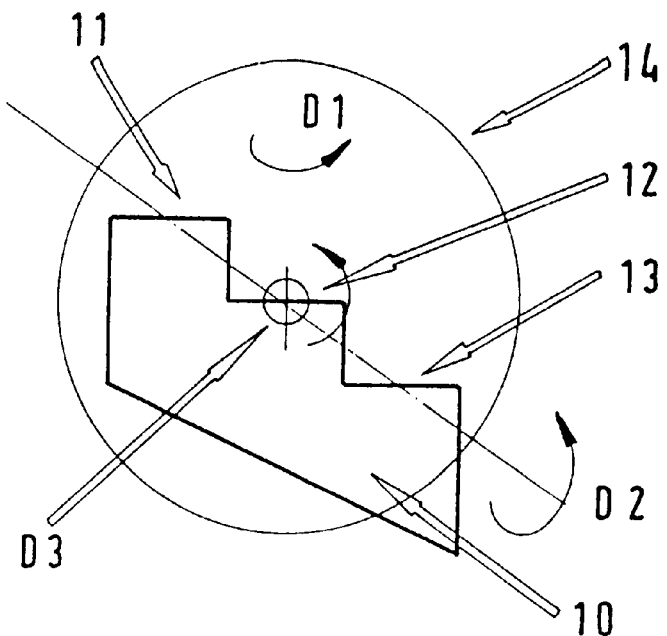
FIG. 3 shows a lateral view and a top view upon the second calibration body.
Figure 3B:
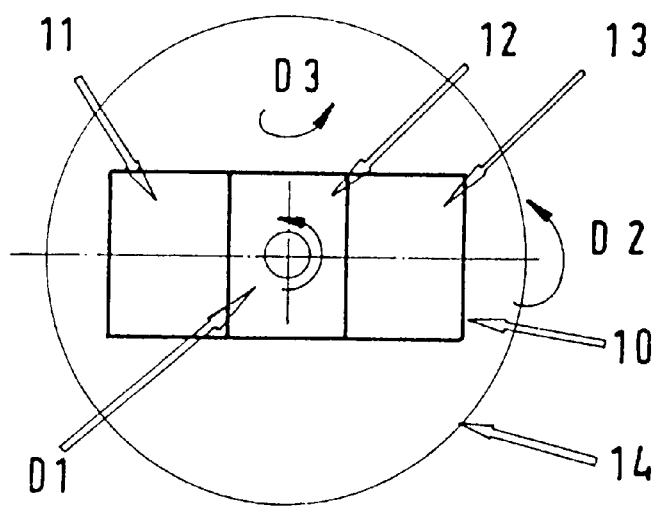

In FIG. 3 a second calibration body 10 is shown in side and top views which determines the three-dimensional position of the axes of rotation D2 and D3. At the same time the respective coordinates of two or more single points on the axis of rotation D2 and on the axis of rotation D3 are measured.

In the embodiment the calibration body 10 comprises three planes 11, 12, 13 which are stepwise disposed to each other and positioned within the measuring volume 14 indicated by a circle. As can be seen from FIG. 3, the axis of rotation D1 is vertically located to the central plane 12, an axis of rotation D2 approximately connects the centres of the planes 11, 12, 13 and the axis of rotation D3 is in parallel with the central plane 12, i.e. the axes of rotation D2 and D3, respectively, extend through the center of the plane 12 approximately wherein this condition has to be fulfilled only in approximation and does not require a proper positioning of the second calibration body 10.

A calculation of the points to be determined on the axis of rotation D2 is achieved by measuring the respective single planes for the different positions of the axis of rotation. Then, the intersection points on the axis are measured for each plane. Hence, accuracy of the calculation of the intersection point is greater with the point being within the measured ranges of the plane and when an interpolation is achieved during the calculation of intersection point. When the point is situated far outside of the center of the plane 12 then an extrapolation is achieved having a worse accuracy. This is accordingly valuable for other planes.

During the adjustment of the axes of rotation D2 and D3 the plane 12 is rotated about the axis of rotation D2 and D3, respectively wherein the normal unit vector of the plane 12 forms an angle being not equal 0° and not equal 90° with the axis of rotation D2 and axis of rotation D3, respectively. Respective angles of 45° and 135° are appropriate. The plane 12 is measured at various positions of the respective axes of rotation D2 and D3 in the same system of coordinates wherein positions of 0°, −45°, +45° are suitable for the axis of rotation D2 and positions of 0°, 45°, 90° are suitable for the axis of rotation D3. From these measurements one point is determined which is located both on the plane 12 and the axis of rotation D2 and axis of rotation D3, respectively. If one of the plane having the above mentioned conditions rotates about the respective axis of rotation D2 and the axis of rotation D3 wherein the normal unit vector of the plane 12 forms an angle being not equal 0° and not equal 90°, then it encircles a double cone and the tip of both cone halves represents one point on the respective axis of rotation D2 and axis of rotation D3. Using such a second plane, for example plane 13 which intersects the respective axis of rotation D2 and axis of rotation D3 in a suitable distance from the first plane 12 a second point on D2 and D3, respectively, can be determined and thus the respective axis of rotation D2 and axis of rotation D3 can be uniquely defined in the space. Using more than two planes 12, 13 and 11, respectively, is possible and improves the accuracy which the position of the axes of rotation D2 and D3, respectively, can be measured.

The substantial requirements regarding the used calibration body 10 with the planes 11 to 13 are as follows: the planes have to be even. The phase values have to be measurable for an essential portion of the points of the single planes 11 to 13 for the plurality of used positions of the axis of rotation D1 i.e. that for each position of the axis of rotation D1 one portion or the entire plane as well have not admittedly necessarily to be measurable, however, in the entity of all positions of the axis of rotation D1 each plane has to be sufficiently well measured. This means that for sufficiently many points of each plane sufficient phase values have to be available for the different positions of the axis of rotation D1 such that the coordinates of the single points can be calculated. Furthermore, a considerable portion of the individual planes 11 to 13 has to be measurable for the plurality of the used positions of the axes of rotation D2 and D3, respectively, in the sense of the above condition for the individual positions of the axis of rotation D1. The distance of the intersection points of the respective axis of rotation D2 and axis of rotation D3 with the respective two and three planes 11 to 13 has to be adapted to the total volume 14 of the system to be measured and should not be smaller than 25% of the extension of the total volume to be measured wherein related to the extension the length, width or height of the measuring volume is to understand, admittedly the greatest of these three values if they are different. If more than two planes are used then the intersection points should be divided into D2 and D3, respectively, in a uniform manner within the measuring volume 14 as in the present embodiment.

The application of other surfaces is possible as long as a superposition of the individual partial measurements (corresponding to the different positions of the axis of rotation D2) results in a definite intersection point on D2 for each plane. Parts of a sphere, cylinder sections or the like are an example for such cases. The calculation of the partial surfaces, however, are lavish and more inaccurate as in the case of using planes as surfaces. Thus, the accuracy of the calculated points on D2 is less as well.

In the following the measuring system is explained more exactly with regard to the individual steps for determining the position of the axes of rotation D2 and D3, respectively.

The calibration body is arranged within the total volume 14 to be measured, i.e within the room of precision measuring, and with the projector 1 according to FIG. 1 at least three phase shifted grids are projected on the calibration body 10 wherein the axes of rotation D1, D2 and D3 respectively comprise a fixed position. The camera 5 measures the intensity distribution i.e. at least three phase shifted images of the projected grids. Subsequently, the phase values for the respective measuring points on the calibration body 10 are calculated by means of the equation indicated above wherein the grid constant Λ and the projection angle α are known.

The previously described respective measurement and determination of the phase values is repeated for at least two further different positions of the calibration body 10 with regard to the axis of rotation D1 (realized by the rotation of the revolving stage 3 about D1), preferably from 3 to 16 positions wherein the positions with regard to the axes of rotation D2 and D3 remain unchanged. Now, the coordinates of the measuring points are calculated using the respective phase values previously determined and by using all positions with regard to the axis of rotation D1. From these coordinates the parameters of all planes 11 to 13 of the second calibration body 10 are determined. The planes can be completely determined by the respective indication of a normal unit vector having the length 1 and the distance towards the origin of coordinates as a scalar quantity.

Thereupon, the above measurements and calculations are repeated for different positions of the calibration body 10 with regard to the axis of rotation D2 (realized by rotation of the second calibration body about D2 with the second revolving stage 8) or about D3 wherein this is either valuable only with regard to the axis of rotation D2 or valuable only with regard to the axis of rotation D3 and admittedly for at least in all three different positions. From these measuring values said at least two points on the axis of rotation D2 and D3, respectively, are calculated by using the previously determined parameters of the different planes 11 to 13. Following, the three-dimensional position of the axis of rotation D2 and the axis of rotation D3, respectively, is determined from these points.

We claim:

1. Device for non-contact measurement of the surface of a three-dimensional object in a room for precision measuring with a projection device which projects a strip structure on the surface of an object, an observing device fore detecting the strip structure at measuring points on the surface of the object, means for moving the object together with the observing device about a first axis of rotation, and an evaluation unit for determining the coordinates of the measuring points using the phase values of the strip structure in a predetermined system of coordinates, the improvement comprising means for moving the object around at least a second axis of rotation (D2) independent of the first axis of rotation (D1) and a calibration unit are provided, the calibration unit (10) allowing the determination of the position of the second axis of rotation (D2) in the predetermined system of coordinates.

2. Device according to claim 1, further comprising means for moving the object (4) around a third axis of rotation (D3) independent of the other axes of rotation (D1, D2) is provided wherein the position of the third axis of rotation in the predetermined system of coordinates can be determined through said calibration unit (9, 10).

3. Device according to claim 1, wherein said calibration unit comprises a first calibration body (9) for determining the grid period ($\Lambda$) in the room of precision measuring and the angle ($\alpha$) between the optical axis of said projection device (2) and the first axis of rotation (D1) and a second calibration body (10) for determining at least two points on the second and third axis of rotation (D2, D3).

4. Device according to claim 3, wherein said first calibration body is formed as a prismatic body (9) having a plurality of adjacent planes ($F_1$–$F_5$) which parameters are predetermined.

5. Device according to claim 3, wherein said second calibration body (10) at least comprises two stepwise planes (11–13) which normal unit vectors form an angle being not equal 0° and being not equal 90° with the second and third axis of rotation.

6. Device according to claim 5, wherein the distance of the intersection points of the second and third axis of rotation (D2, D3) with the two planes (11–13) is adapted to the total volume to be measured.

7. Device according to claim 6, wherein the distance of the intersection points is not less than 25% of the extension of the total volume to be measured.

8. Device according to claim 3, $\alpha$ wherein a first measuring operation with the second calibration body (10) having a fixed position with regard to the first, the second and in case the third axes of rotation (D1, D2, D3) the distribution of intensity of at least three images being obtained based on phase shifted grid structures is determined at measuring points, and the phase values are calculated at said measuring points, that said first measuring operation is repeated as a second measuring operation for at least two further different positions of said second calibration body (10) with regard to said first axis of rotation (D1) and the parameters of the planes (11–13) of said second calibration body (10) are calculated using the phase values, and the first and second measuring operations are repeated as a third measuring operation for different positions of the calibration body (10) with regard to the second axis of rotation (D2) or the third axis of rotation (D3), and at least two points on the second axis of rotation (D2) and on the third axis of rotation (D3), respectively, are calculated using the parameters of the different planes of the second calibration body (10) and the three-dimensional position of the second axis of rotation (D2) and the three-dimensional position of the axis of rotation (D3) are calculated using the points.

9. Device according to claim 8, wherein the parameters of the planes (11–13) are the respective normal unit vector and the spacing towards the origin of the system of coordinates.

10. Device according to claim 1, wherein depending on the phase values measured with the first calibration body (9) and the known parameters of the first calibration body (9) said evaluation unit calculates coordinates on the calibration body (9) by means of arbitrarily selected start values of the grid period ($\Lambda$) and the angle ($\alpha$) between the optical axis of the projection device (2) and the first axis of rotation (D1) and determines the actual values of the grid period ($\Lambda$) and the angle ($\alpha$) by a following iterative correction.

* * * * *